United States Patent
Okamoto et al.

(10) Patent No.: US 12,140,517 B2
(45) Date of Patent: Nov. 12, 2024

(54) VISCOSITY ESTIMATION DEVICE AND VISCOSITY ESTIMATION METHOD

(71) Applicant: Yokogawa Electric Corporation, Tokyo (JP)

(72) Inventors: Hirofumi Okamoto, Musashino (JP); Eiji Taya, Musashino (JP); Katsuya Ohshima, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 454 days.

(21) Appl. No.: 17/604,028

(22) PCT Filed: Apr. 15, 2020

(86) PCT No.: PCT/JP2020/016547
§ 371 (c)(1),
(2) Date: Oct. 15, 2021

(87) PCT Pub. No.: WO2020/213636
PCT Pub. Date: Oct. 22, 2020

(65) Prior Publication Data
US 2022/0214257 A1 Jul. 7, 2022

(30) Foreign Application Priority Data
Apr. 19, 2019 (JP) ................. 2019-080281

(51) Int. Cl.
*G01N 11/14* (2006.01)
(52) U.S. Cl.
CPC .................. *G01N 11/14* (2013.01)

(58) Field of Classification Search
CPC .......... G01N 11/14; G01N 2011/0053; G01N 2011/0066; G01D 5/243; G01D 5/12; G01P 3/44; G06F 17/10
See application file for complete search history.

(56) References Cited

U.S. PATENT DOCUMENTS

| | | | | |
|---|---|---|---|---|
| 4,472,963 A | * | 9/1984 | Gyer ...................... | G01N 11/14 73/54.34 |
| 2013/0172507 A1 | * | 7/2013 | Ebisawa ................ | G01N 11/14 702/50 |
| 2016/0061805 A1 | * | 3/2016 | Prabhu ................... | G01N 33/30 73/114.55 |

FOREIGN PATENT DOCUMENTS

| | | |
|---|---|---|
| JP | 11-295205 A | 10/1999 |
| JP | 2010-190882 A | 9/2010 |

OTHER PUBLICATIONS

Murakami et al., "Torque Sensorless Control in Multidegree-of-Freedom Manipulator", IEEE Transactions on Industrial Electronics, Apr. 1993, vol. 40, No. 2, pp. 259-265; Cited in Specification.

* cited by examiner

*Primary Examiner* — Tarun Sinha
(74) *Attorney, Agent, or Firm* — RANKIN, HILL & CLARK LLP

(57) ABSTRACT

A viscosity estimation device includes: a current detector detecting a drive current supplied to an induction motor which stirs a substance due to rotation of a rotating shaft which is rotationally driven; a rotation detector detecting rotation of the rotating shaft; and a calculator obtaining a viscosity correlation value, which is a value having a correlation with a viscosity of the substance, using a detection result of the current detector and a detection result of the rotation detector.

20 Claims, 3 Drawing Sheets

VISCOSITY ESTIMATION DEVICE AND VISCOSITY ESTIMATION METHOD

TECHNICAL FIELD

Some preferred aspects of the present invention relate to a viscosity estimation device and a viscosity estimation method.

Priority is claimed on Japanese Patent Application No. 2019-080281 filed in Japan on Apr. 19, 2019, the content of which is incorporated herein by reference.

BACKGROUND ART

In a plant or factory, there are cases in which a reaction step of accelerating a chemical reaction of raw materials or an stirring step of mixing raw materials of various types is performed to obtain a predetermined product or an intermediate material. In such a step, a chemical reaction of raw materials is accelerated or a degree of mixing of raw materials is made uniform by rotating a rotating shaft to which rotary blades are attached using an electric motor. Here, an acceleration status of the chemical reaction and a mixing status are estimated by measuring a viscosity of the product or intermediate material.

Currently, a rotational viscometer has been mainstream for viscometers for measuring a viscosity. This rotational viscometer measures a viscosity by detecting a reaction torque acting on a rotating shaft in case that the rotating shaft is rotated and converting the detection result into a viscosity. In case that such a rotational viscometer is applied to online measurement, for example, a strain gauge (torque sensor) attached to the rotating shaft for detecting a reaction torque and a calculator converting a detection result of the strain gauge into a viscosity are thought to be necessary.

Further, the following Non-Patent Literature 1 discloses a conventional method for detecting a reaction torque acting on a rotating shaft. Specifically, in the method disclosed in Non-Patent Literature 1 below, a reaction torque received by the rotating shaft is detected on the basis of an angular response of the rotating shaft.

CITATION LIST

Non-Patent Literature

[Non-Patent Literature 1]
T. Murakami F. Yu and K. Ohnishi "Torque sensorless control in multidegree-of-freedom manipulator" IEEE Trans. Ind. Electron. Vol. 40 No. 2 pp. 259-265 April. 1993.

SUMMARY OF INVENTION

Technical Problem

Incidentally, in case that a rotational viscometer is applied to online measurement, as described above, a strain gauge for detecting a reaction torque acting on a rotating shaft needs to be attached to the rotating shaft. Here, since a strain gauge is liable to deteriorate due to high temperatures, it may not be usable depending on an environmental temperature. Also, since existing equipment may need to be disassembled or processed for attaching a strain gauge, it may be difficult to attach the strain gauge to a rotating shaft.

Some preferred aspects of the present invention have been made in view of the above circumstances, and an objective thereof is to provide a viscosity estimation device and a viscosity estimation method that can estimate a viscosity without using a strain gauge and can be applied to online measurement of viscosity.

Solution to Problem

To solve the above-described problem, a viscosity estimation device according to one aspect of the present invention is a viscosity estimation device (1, 2) which estimates a viscosity of a substance stirred by a rotation of a rotating shaft (AX) rotationally driven by an induction motor (IM), wherein the viscosity estimation device includes: a current detector (10) detecting a drive current supplied to the induction motor; a rotation detector (20, 20A) detecting rotation of the rotating shaft; and a calculator (30, 30A) obtaining a viscosity correlation value (ST), which is a value having a correlation with a viscosity of the substance, using a detection result of the current detector and a detection result of the rotation detector.

In addition, in the viscosity estimation device according to one aspect of the present invention, the calculator may include: a slip ratio calculator (33) obtaining a slip ratio of the rotating shaft using the detection result of the current detector and the detection result of the rotation detector; an effective value calculator (34) obtaining an effective value of the drive current from the detection result of the current detector; and a viscosity correlation value calculator (35) obtaining the viscosity correlation value using a calculation result of the slip ratio calculator and a calculation result of the effective value calculator.

In addition, in the viscosity estimation device according to one aspect of the present invention, the calculator may include a frequency calculator (31) obtaining a frequency of the drive current from the detection result of the current detector, and the slip ratio calculator may obtain a slip ratio of the rotating shaft using a calculation result of the frequency calculator and a rotation speed of the rotating shaft obtained from the detection result of the rotation detector.

In addition, in the viscosity estimation device according to one aspect of the present invention, the calculator may include a rotation speed calculator (32) obtaining a rotation speed of the rotating shaft from the detection result of the rotation detector.

In addition, in the viscosity estimation device according to one aspect of the present invention, in case that it is assumed that the viscosity correlation value is ST, a frequency of the drive current may be $\omega$ [rad/s] or [Hz], a rotation speed of the rotating shaft is $\omega_m$ [rad/s] or [Hz], the effective value of the drive current is $I_a$, and the slip ratio of the rotating shaft is s [%], the viscosity correlation value calculator obtains the viscosity correlation value ST by performing a calculation shown in the following expression (1).

[Math. 1]

$$ST = \frac{\omega}{\omega_m} \cdot I_a^2 \cdot s \qquad (1)$$

In addition, in the viscosity estimation device according to one aspect of the present invention, the drive current may have three phases, and the current detector may detect all phases of the three phases.

In addition, in the viscosity estimation device according to one aspect of the present invention, the drive current may have three phases, and the current detector may detect only one specific phase of the three phases.

In addition, in the viscosity estimation device according to one aspect of the present invention, in case that it is assumed that the slip ratio is s, a frequency of the drive current detected by the current detector is ω, and a rotation speed of the rotating shaft detected by the rotation detector is $\omega_m$, the slip ratio calculator may perform a calculation of $s=(\omega-\omega_m)/\omega$ to obtain the slip ratio.

In addition, in the viscosity estimation device according to one aspect of the present invention, the frequency calculator may obtain a frequency of the drive current each time the rotating shaft rotates by a prescribed number of revolutions.

In addition, in the viscosity estimation device according to one aspect of the present invention, the effective value calculator may obtain the effective value of the drive current each time the rotating shaft rotates by the number of revolutions.

In addition, in the viscosity estimation device according to one aspect of the present invention, the calculator may further include a viscosity correlation value viscosity calculator (36) which converts the viscosity correlation value obtained by the viscosity correlation value calculator into a viscosity value of the substance.

In addition, in the viscosity estimation device according to one aspect of the present invention, the calculator further may include a filter calculator (37) which performs smoothing processing on the viscosity value converted by the viscosity correlation value viscosity calculator.

In addition, in the viscosity estimation device according to one aspect of the present invention, the rotation detector may detect the rotation after the current detector has detected the drive current.

In the viscosity estimation device according to one aspect of the present invention, the current detector may detect the drive current after the rotation detector has detected the rotation.

In addition, in the viscosity estimation device according to one aspect of the present invention, the current detector may perform processing of detecting the drive current in parallel with processing of detecting the rotation by the rotation detector.

In addition, in the viscosity estimation device according to one aspect of the present invention, the rotation detector may be an encoder.

In addition, in the viscosity estimation device according to one aspect of the present invention, the rotation detector may be a tachometer.

A viscosity estimation method according to one aspect of the present invention is a viscosity estimation method for estimating a viscosity of a substance stirred by a rotation of a rotating shaft (AX) rotationally driven by an induction motor (IM), the viscosity estimation method including: a detection step (S11) of detecting a drive current supplied to the induction motor; a rotation detection step (S14) of detecting rotation of the rotating shaft; and a calculation step (S17) of obtaining a viscosity correlation value, which is a value having a correlation with a viscosity of the substance, using a detection result of the current detection step and a detection result of the rotation detection step.

Advantageous Effects of Invention

According to some preferred aspects of the present invention, there is an effect that a viscosity can be estimated without using a strain gauge and this is applicable to online measurement of viscosity.

DESCRIPTION OF EMBODIMENTS

Figure 1:
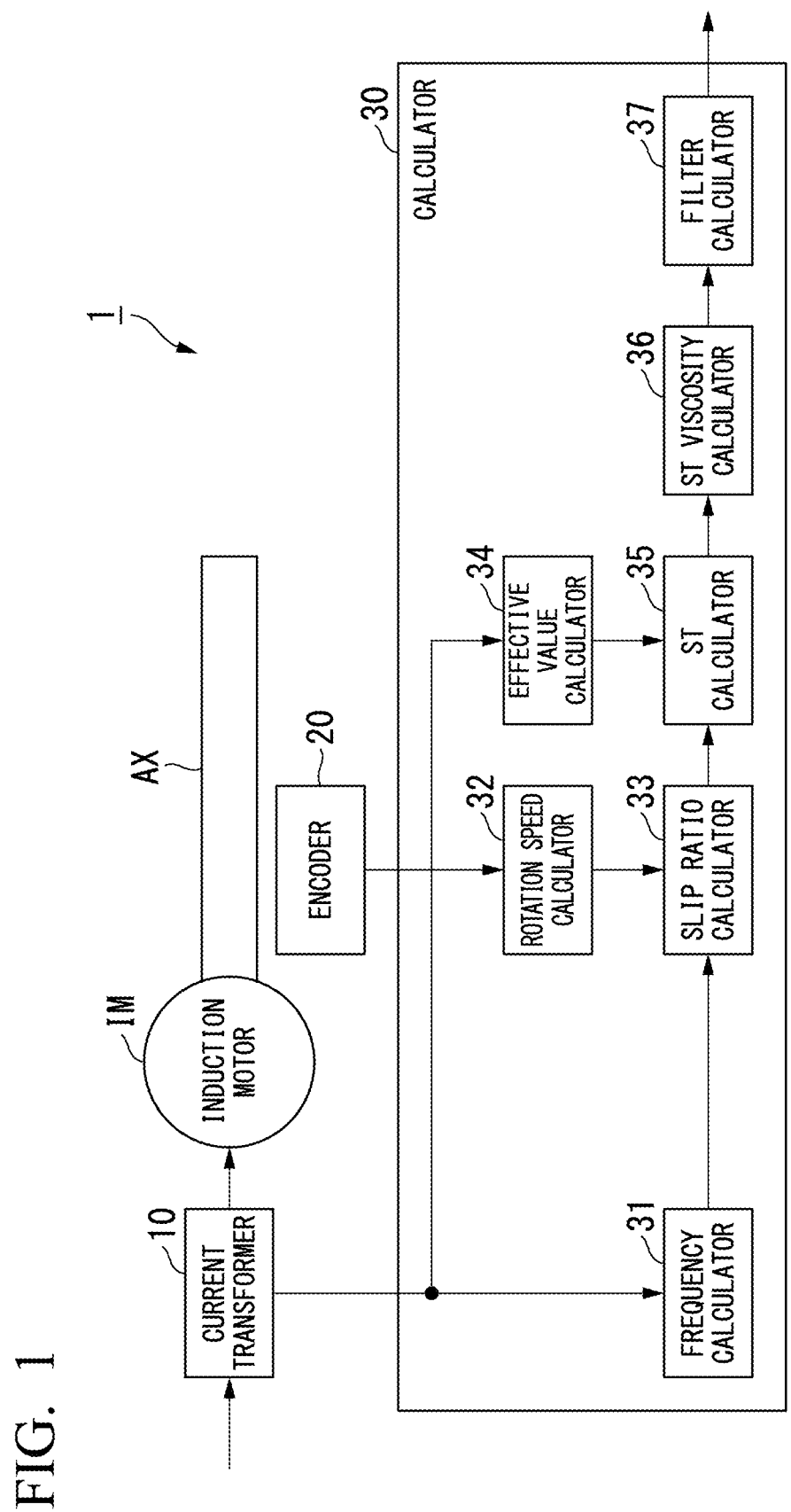
FIG. 1 is a block diagram showing a configuration of a main part of a viscosity estimation device according to one embodiment of the present invention.

Hereinafter, a viscosity estimation device and a viscosity estimation method according to one embodiment of the present invention will be described in detail with reference to the drawings. Hereinafter, an outline of the embodiment of the present invention will be described first, and then details of each embodiment of the present invention will be described.

[Outline]

In the embodiment of the present invention, a viscosity can be estimated without using a strain gauge and this can be applied to online measurement of viscosity. For example, the embodiment of the present invention makes it possible to continuously estimate a viscosity of a material in a device (for example, a reactor or stirring device) that stirs the material in a tank by rotating a rotating shaft having stirring blades with an induction motor online.

Here, in the Japanese Industrial Standards (JIS: Japanese Industrial Standards), viscometers are classified into six types (JIS Z 8803) including a capillary viscometer, a falling ball viscometer, a coaxial double cylindrical rotational viscometer, a single cylindrical rotational viscometer, a cone-and-plate rotational viscometer, and a vibrational viscometer. Such viscometers are generally used as a testing instrument used in a research laboratory, an experimental laboratory, or the like. Therefore, conventionally, in a plant or the like, quality control has been performed by removing a sample from a product or an intermediate material being manufactured and measuring a viscosity of the removed sample in a measuring room.

Since an influence of measurement variation needs to be reduced in case that measuring a viscosity, viscosity measurements are performed a plurality of times by a tester having specialized knowledge. Therefore, viscosity measurement for a product requires a certain amount of time, and this has been a hindrance to productivity improvement and quality improvement. Here, a device for continuously measuring a viscosity online has also been realized, but it is expensive, requires special design for installation, and requires frequent maintenance to maintain the performance thereof. Therefore, it is the current situation that a device for continuously measuring a viscosity online has a limited field of application.

Currently, rotational viscometers are mainstream for viscometers for measuring a viscosity. In case that such a rotational viscometer is applied to online measurement, for example, a strain gauge (torque sensor) attached to a rotating shaft for detecting a reaction torque and a calculator converting a detection result of the strain gauge into a viscosity are thought to be necessary. Here, since the strain gauge is liable to deteriorate due to high temperatures, it may not be usable depending on an environmental temperature. Also, since existing equipment may need to be disassembled or processed for attaching a strain gauge, it may be difficult to attach the strain gauge to a rotating shaft.

In the embodiment of the present invention, a drive current supplied to an induction motor that rotationally drives a rotating shaft stirring a substance whose viscosity is a target to be estimated is detected, rotation of the rotating shaft is detected, and a detection result of the drive current and a detection result of the rotation of the rotating shaft are used to obtain a viscosity correlation value which is a value having a correlation with a viscosity of the substance. Thereby, a viscosity can be estimated without using a strain gauge, and this can be applied to online measurement of viscosity.

EMBODIMENT

<Viscosity Estimation Device>

FIG. 1 is a block diagram showing a configuration of a main part of a viscosity estimation device 1 according to one embodiment of the present invention. As shown in FIG. 1, the viscosity estimation device 1 of the present embodiment includes a current transformer 10 (also referred to as a current detector), an encoder 20 (also referred to as a rotation detector), and a calculator 30. The viscosity estimation device 1 having such a configuration estimates a viscosity of a substance that is stirred by rotation of a rotating shaft AX that is rotationally driven by an induction motor IM. Further, the substance stirred by rotation of the rotating shaft AX may be an arbitrary substance.

Here, the induction motor IM includes a stator having a coil and a rotor having, for example, a cage-shaped structure, and the rotor is rotated by a rotating magnetic field formed by the coil of the stator. The induction motor IM may be driven by a single-phase alternating current or may be driven by a three-phase alternating current. In the present embodiment, a case in which the induction motor IM is driven by a three-phase alternating current will be described.

The rotating shaft AX is, for example, a columnar (rod-shaped) member, and is rotationally driven by rotation of the rotor of the induction motor IM. The rotating shaft AX may be connected to the rotor of the induction motor IM via a speed reducer having a prescribed speed reduction ratio. In a case in which such a speed reducer is provided, for example, in case that a drive current at a predetermined frequency (for example, 10 [Hz]) is supplied to the induction motor IM, the rotating shaft AX rotates at a predetermined number of revolutions (for example, 100 [rpm]) in a state of no load. Further, the rotating shaft AX may be directly attached to and coaxial with the rotor of the induction motor IM. Also, stirring blades may be provided on the rotating shaft AX.

The current transformer 10 detects a drive current supplied to the induction motor IM. Further, the current transformer 10 may detect all phases (three phases) of the drive current supplied to the induction motor IM or may detect only one specific phase. In the present embodiment, the current transformer 10 is assumed to detect only one specific phase of the three phases. A detection result of the current transformer 10 is output to the calculator 30.

The encoder 20 detects rotation of the rotating shaft AX. Specifically, the encoder 20 detects an amount of rotation (or a rotational position) of the rotating shaft AX and outputs the number of pulses corresponding to a detection result thereof. The encoder 20 may be of a mechanical rotary encoder or may be of an optical rotary encoder. The detection result of the encoder 20 is output to the calculator 30.

The calculator 30 includes a frequency calculator 31, a rotation speed calculator 32, a slip ratio calculator 33, an effective value calculator 34, an ST calculator 35 (also referred to as a viscosity correlation value calculator), an ST viscosity calculator 36, and a filter calculator 37. The calculator 30 having such a configuration obtains a viscosity correlation value ST (also referred to as a slip torque coefficient), which is a value having a correlation with a viscosity of a substance, using the detection result of the current transformer 10 and the detection result of the encoder 20, and estimates a viscosity of the substance on the basis of the viscosity correlation value ST.

The frequency calculator 31 obtains a frequency $\omega$ [rad/s] or [Hz] of the drive current supplied to the induction motor IM from the detection result of the current transformer 10. For example, the frequency calculator 31 may be configured to obtain the frequency $\omega$ of the drive current supplied to the induction motor IM each time the rotating shaft AX rotates by a prescribed number of revolutions N (N is an integer of 1 or more). Further, a timing or a period for obtaining the frequency $\omega$ of the drive current supplied to the induction motor IM by the frequency calculator 31 can be arbitrarily set.

The rotation speed calculator 32 obtains a rotation speed $\omega_m$ [rad/s] or [Hz] of the rotating shaft AX from the detection result of the encoder 20. For example, the rotation speed calculator 32 may be configured to obtain the rotation speed $\omega_m$ of the rotating shaft AX every time a prescribed time (for example, 1 [s]) elapses. Further, a timing or a period for obtaining the rotation speed $\omega_m$ of the rotating shaft AX by the rotation speed calculator 32 can be arbitrarily set.

The slip ratio calculator 33 obtains a slip ratio of the rotating shaft AX using the detection result of the current transformer 10 and the detection result of the encoder 20. Specifically, the slip ratio calculator 33 obtains the slip ratio of the rotating shaft AX using the frequency $\omega$ of the drive current obtained by the frequency calculator 31 using the detection result of the current transformer 10 and the rotation speed $\omega_m$ of the rotating shaft AX obtained by the rotation speed calculator 32 using the detection result of the encoder 20. More specifically, the slip ratio calculator 33 performs the calculation shown in the following expression (2) to obtain a slip ratio s [%] of the rotating shaft AX.

[Math. 2]

$$s = \frac{\omega - \omega_m}{\omega} \quad (2)$$

The effective value calculator 34 obtains an effective value $I_a$ [A] of the drive current supplied to the induction motor IM from the detection result of the current transformer 10. For example, the effective value calculator 34 may be configured to obtain the effective value $I_a$ of the drive current each time the rotating shaft AX rotates by the prescribed number of revolutions N as in the frequency calculator 31. Further, a timing or a period for obtaining the effective value $I_a$ of the drive current by the effective value calculator 34 can be arbitrarily set.

The ST calculator 35 obtains a viscosity correlation value ST using a calculation result of the slip ratio calculator 33 and a calculation result of the effective value calculator 34. Specifically, the ST calculator 35 performs the calculation shown in the following expression (3) to obtain the viscosity correlation value ST by using the frequency ω of the drive current obtained by the frequency calculator 31, the rotation speed $\omega_m$ of the rotating shaft AX obtained by the rotation speed calculator 32, the effective value $I_a$ of the drive current obtained by the effective value calculator 34, and the slip ratio s of the rotating shaft AX obtained by the slip ratio calculator 33.

[Math. 3]

$$ST = \frac{\omega}{\omega_m} \cdot I_a^2 \cdot s \tag{3}$$

Here, a case in which a model of the induction motor IM in a stationary coordinate system (αβ coordinate system) is converted into a dq coordinate system may be conceived. In case that it is assumed that the number of poles of the induction motor IM is P, a mutual inductance between the stator and the rotor is M, a maximum value of a current on a d-axis is $I_d$, and a direct current (DC) resistance value of the rotor is $R_r$, a generated torque $\tau_e$ in a steady state of the induction motor IM is represented by the following expression (4).

[Math. 4]

$$\tau_e = \frac{P}{2} \frac{s\omega M^2 I_d^2}{R_r} \tag{4}$$

Also, in case that it is assumed that a braking coefficient (=viscosity) is $R_m$ and Coulomb friction is $T_l$, a generated torque τe in a steady state of the induction motor IM is represented by the following expression (5).

[Math. 5]

$$\tau_e = R_m \omega_m + T_l \tag{5}$$

The following expression (6) can be obtained from the above expressions (4) and (5).

[Math. 6]

$$R_m = \frac{P}{2} \frac{s\omega M^2 I_d^2}{R_r} \frac{1}{\omega_m} - \frac{T_l}{\omega_m} \tag{6}$$

Now, in case that the mutual inductance M between the stator and the rotor, the DC resistance value $R_r$ of the rotor, and the Coulomb friction $T_l$ are assumed to be constant, the following two conditions are assumed.

A rate of change of the d-axis current is almost constant and is proportional to the effective value Ia of the drive current.

The rotation speed $\omega_m$ of the rotating shaft AX does not change significantly.

Then, the above expression (6) is represented by the following expression (7).

[Math. 7]

$$R_m \alpha \frac{\omega}{\omega_m} \cdot I_a^2 \cdot s \tag{7}$$

From the above expression (7), it can be ascertained that the braking coefficient $R_m$, indicating the viscosity is proportional to the product of a value obtained by dividing the frequency ω of the drive current by the rotation speed $\omega_m$ of the rotating shaft AX, the square of the effective value $I_a$ of the drive current, and the slip ratio s of the rotating shaft AX. Therefore, the viscosity correlation value ST, which is a value having a correlation with a viscosity of the substance, can be represented as in the above expression (3).

The ST viscosity calculator 36 converts the viscosity correlation value ST obtained by the ST calculator 35 into a viscosity value D. Specifically, the ST viscosity calculator 36 performs a calculation D=A·ST+B to convert the viscosity correlation value ST into the viscosity value D. Here, the variables A and B in the above expression may be stored in the ST viscosity calculator 36 in advance prior to measurement of a viscosity of the substance and may be input to the ST viscosity calculator 36 in case that measurement of a viscosity of the substance is performed. Further, the variable A in the above expression defines a scale factor (enlargement/reduction factor) of the viscosity correlation value ST, and the variable B in the above expression defines an offset of the viscosity correlation value ST.

The filter calculator 37 performs smoothing processing using a filter such as, for example, a primary delay filter (low-pass filter). In case that such smoothing processing is performed, since, for example, high frequency components are removed, a viscosity of the substance can be estimated with high accuracy. Data (for example, data indicating the viscosity) obtained by the smoothing processing performed in the filter calculator 37 is collected by a data collecting device or displayed on a display device via, for example, a network (not shown).

<Viscosity Estimation Method>

Figure 2:
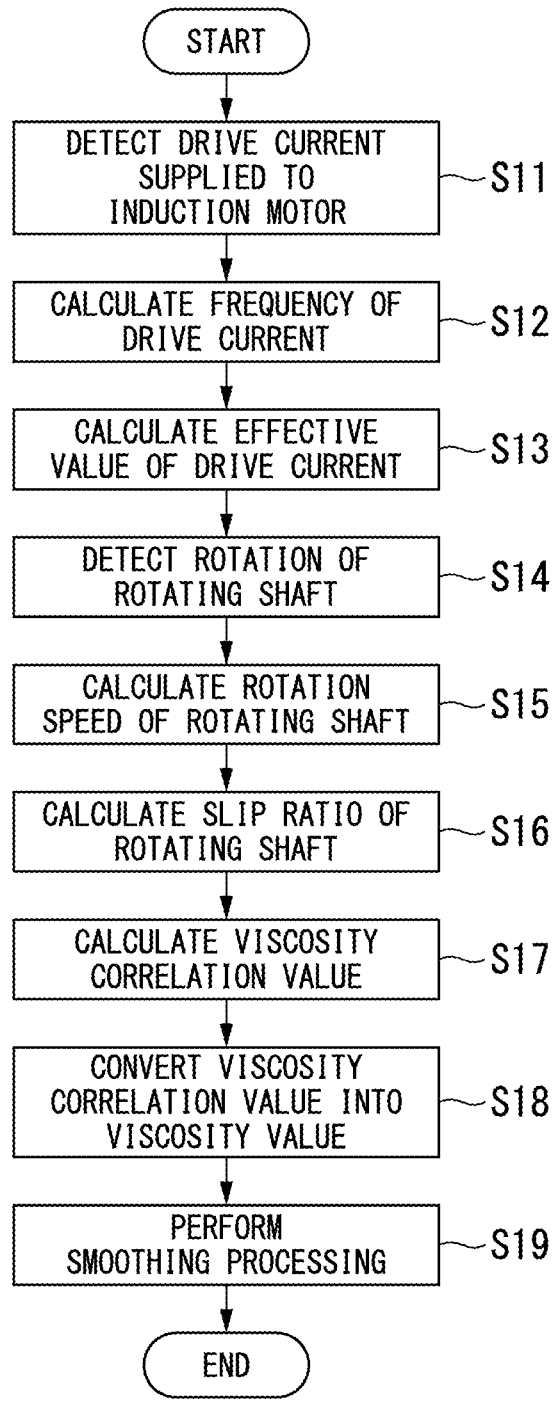
FIG. 2 is a flowchart showing a viscosity estimation method according to one embodiment of the present invention.

FIG. 2 is a flowchart showing a viscosity estimation method according to one embodiment of the present invention. The flowchart shown in FIG. 2 is repeated, for example, at a preset regular cycle time. Here, a state in which a drive current is supplied to the induction motor IM from a drive device (not shown), the rotating shaft AX is rotationally driven by the induction motor IM, and a predetermined substance is stirred by rotation of the rotating shaft AX is assumed.

In case that the processing of the flowchart shown in FIG. 2 is started, the current transformer 10 first detects a drive current supplied to the induction motor IM (step S11: also referred to as a current detection step). The current transformer 10 outputs the drive current detected by the current transformer 10 to the calculator 30. Then, the frequency calculator 31 obtains the frequency ω of the drive current supplied to the induction motor IM from the detection result of the current transformer 10 (step S12). Also, the effective value calculator 34 obtains the effective value $I_a$ of the drive current supplied to the induction motor IM from the detection result of the current transformer 10 (step S13).

Next, the encoder 20 detects rotation of the rotating shaft AX (step S14: also referred to as a rotation detection step). The encoder 20 outputs the detection result of the encoder 20 to the calculator 30. Then, the rotation speed calculator 32 obtains the rotation speed $\omega_m$ of the rotating shaft AX from the detection result of the encoder 20 (step S15).

Next, the slip ratio calculator 33 obtains a slip ratio of the rotating shaft AX by using the frequency ω of the drive current obtained by the frequency calculator 31 and the rotation speed $ω_m$ of the rotating shaft AX obtained by the rotation speed calculator 32 (step S16). Specifically, the slip ratio calculator 33 performs the calculation shown in the above-described expression (2) to obtain the slip ratio s [%] of the rotating shaft AX.

Next, the ST calculator 35 obtains the viscosity correlation value ST by using the frequency ω of the drive current obtained by the frequency calculator 31, the rotation speed $ω_m$ of the rotating shaft AX obtained by the rotation speed calculator 32, the effective value $I_a$ of the drive current obtained by the effective value calculator 34, and the slip ratio s of the rotating shaft AX obtained by the slip ratio calculator 33 (step S17: also referred to as a calculation step). Specifically, the ST calculator 35 performs the calculation shown in the above-described expression (3) to obtain the viscosity correlation value ST.

In case that the above-described processing is completed, the ST viscosity calculator 36 converts the viscosity correlation value ST obtained by the ST calculator 35 into the viscosity value D (step S18). Specifically, the ST viscosity calculator 36 performs the calculation D=A·ST+B to convert the viscosity correlation value ST into the viscosity value D. Then, the filter calculator 37 performs smoothing processing using a filter such as, for example, a primary delay filter (low-pass filter) (step S19). Then, data (for example, data indicating the viscosity) obtained by performing the smoothing processing is collected by a data collecting device or displayed on a display device via, for example, a network (not shown).

In the flowchart shown in FIG. 2, for convenience of explanation, an example in which the processing of steps S14 and S15 are performed after completing the processing of steps S11 to S13 is shown. However, the processing of steps S14 and S15 may be performed before the processing of steps S11 to S13 or may be performed in parallel with the processing of steps S11 to S13.

Modified Example

Figure 3:
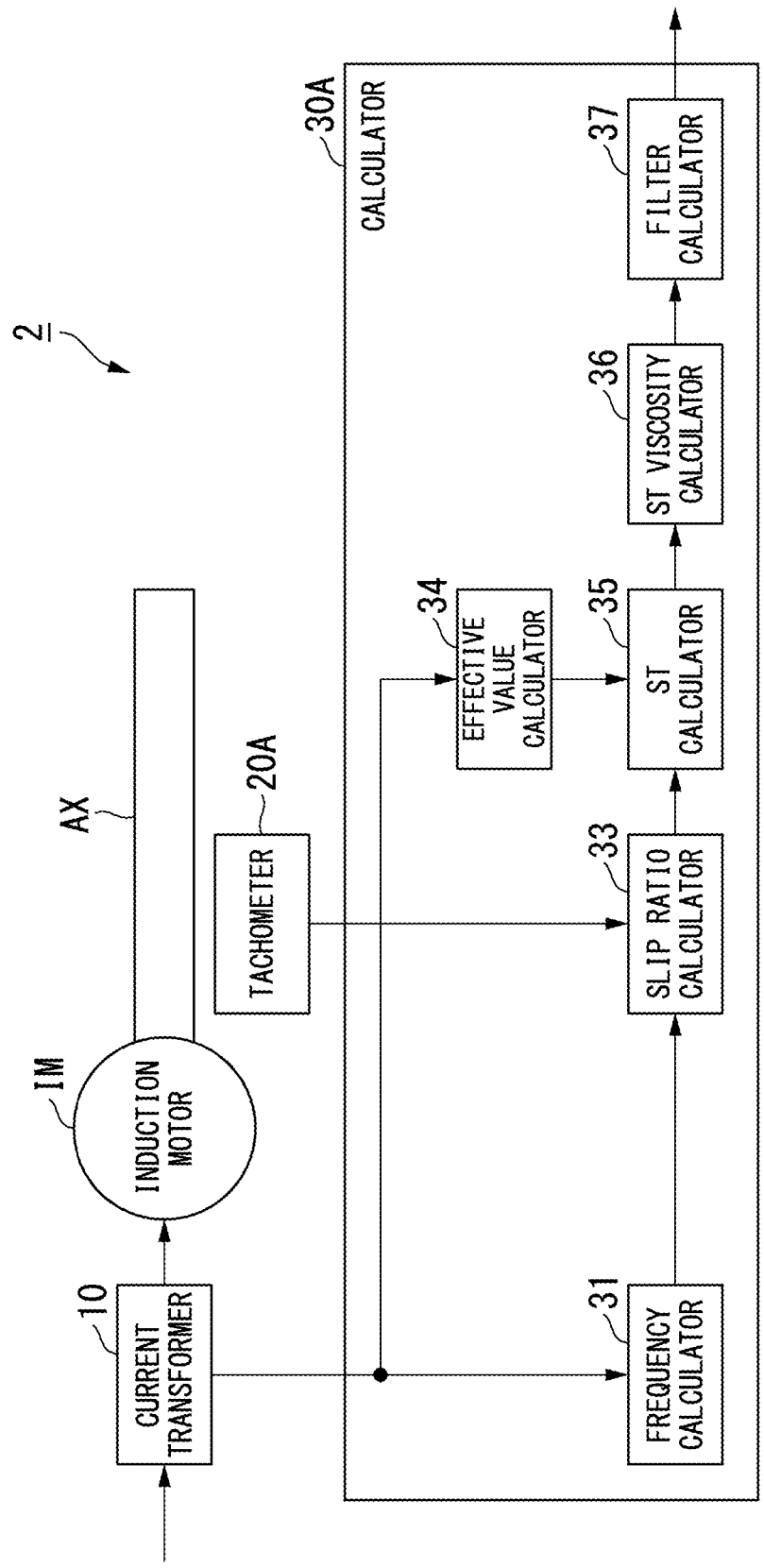
FIG. 3 is a block diagram showing a configuration of a modified example of a viscosity estimation device according to one embodiment of the present invention.

FIG. 3 is a block diagram showing a configuration of a modified example of a viscosity estimation device 2 according to one embodiment of the present invention. As shown in FIG. 1, the viscosity estimation device 2 according to the present modified example has a configuration in which the encoder 20 of the viscosity estimation device 1 shown in FIG. 1 is replaced with a tachometer 20A (rotation detector) and the calculator 30 is replaced with a calculator 30A. The tachometer 20A detects the rotation speed $ω_m$[rad/s] or [Hz] of the rotating shaft AX. The tachometer 20A may be of a mechanical type or may be of an electric type.

The calculator 30A has a configuration in which the rotation speed calculator 32 of the calculator 30 shown in FIG. 1 is omitted, and a detection result of the tachometer 20A is directly input to the slip ratio calculator 33 of the calculator 30A. That is, since the tachometer 20A can directly detect the rotation speed $θ_m$ of the rotating shaft AX, the rotation speed calculator 32 for obtaining the rotation speed $ω_m$ of the rotating shaft AX from the detection result of the encoder 20 is omitted.

The flowchart showing the viscosity estimation method according to the present modified example is almost the same as the flowchart shown in FIG. 2. Specifically, in the flowchart showing the viscosity estimation method according to the present modified example, the "detecting rotation of the rotating shaft" in step S14 in FIG. 2 is read as "detecting a rotation speed of the rotating shaft," and step S15 is omitted.

As described above, in the embodiment of the present invention, a drive current supplied to the induction motor that rotationally drives the rotating shaft stirring a substance whose viscosity is a target to be estimated is detected, rotation of the rotating shaft is detected, and the detection result of the drive current and the detection result of the rotation of the rotating shaft are used to obtain a viscosity correlation value which is a value having a correlation with a viscosity of the substance. Thereby, a viscosity can be estimated without using a strain gauge, and this can be applied to online measurement of viscosity.

Although the viscosity estimation device and the viscosity estimation method according to one embodiment of the present invention have been described above, the present invention is not limited to the above-described embodiment and can be freely changed within the scope of the present invention. For example, in the above-described embodiment, the viscosity correlation value ST, which is a value having a correlation with a viscosity of the substance, has been obtained using the detection result of the current transformer 10 and the detection result of the encoder 20 (or the tachometer 20A), and the viscosity of the substance estimated on the basis of the viscosity correlation value ST has been collected by a data collecting device or displayed on a display device via a network.

However, the detection result of the current transformer 10 and the detection result of the encoder 20 may be collected via a network, and the viscosity correlation value ST may be obtained and the viscosity may be estimated on the basis of the collected detection results. In this way, a viscosity of a substance can be estimated at a distant place away from an installation location of the induction motor IM and the rotating shaft AX.

Further, in case that the viscosity correlation value ST described above is utilized, a status of progressing can be estimated also for dispersion or an emulsification treatment that has been performed by stirring a liquid at high speed.

REFERENCE SIGNS LIST 1, 2 Viscosity estimation device
10 Current transformer
20 Encoder
20A Tachometer
30, 30A Calculator
31 Frequency calculator
32 Rotation speed calculator
33 Slip ratio calculator
34 Effective value calculator
35 ST calculator
AX Rotating shaft
IM Induction motor
ST Viscosity correlation value

The invention claimed is:

1. A viscosity estimation device configured to estimate a viscosity of a substance stirred by a rotation of a rotating shaft rotationally driven by an induction motor, the viscosity estimation device comprising:
a current detector detecting a drive current supplied to the induction motor;
a rotation detector detecting rotation of the rotating shaft; and
a calculator obtaining a viscosity correlation value, which is a value having a correlation with a viscosity of the substance, using a detection result of the current detector and a detection result of the rotation detector,
wherein the calculator comprises:
a slip ratio calculator obtaining a slip ratio of the rotating shaft using the detection result of the current detector and the detection result of the rotation detector;
an effective value calculator obtaining an effective value of the drive current from the detection result of the current detector;
a frequency calculator obtaining a frequency of the drive current from the detection result of the current detector; and
a viscosity correlation value calculator obtaining the viscosity correlation value using a calculation result of the slip ratio calculator, a calculation result of the effective value calculator, and a calculation result of the frequency calculator, and
wherein the viscosity correlation value calculator is configured to obtain the viscosity correlation value by multiplying:
a value obtained by dividing the frequency of the drive current by a rotation speed of the rotating shaft obtained by the detection result of the rotation detector;
square of the effective value of the drive current; and
the slip ratio of the rotating shaft.

2. The viscosity estimation device according to claim 1, wherein
the slip ratio calculator is configured to obtain a slip ratio of the rotating shaft using a calculation result of the frequency calculator and the rotation speed of the rotating shaft obtained from the detection result of the rotation detector.

3. The viscosity estimation device according to claim 2, wherein the calculator includes a rotation speed calculator obtaining the rotation speed of the rotating shaft from the detection result of the rotation detector.

4. The viscosity estimation device according to claim 1, wherein, in case that it is assumed that the viscosity correlation value is ST, the frequency of the drive current is $\omega$ [rad/s] or [Hz], the rotation speed of the rotating shaft is $\omega_m$ [rad/s] or [Hz], the effective value of the drive current is $I_a$, and the slip ratio of the rotating shaft is s [%], the viscosity correlation value calculator is configured to obtain the viscosity correlation value ST by performing a calculation shown in the following expression (1)

$$ST = \frac{\omega}{\omega_m} \cdot I_a^2 \cdot s. \qquad (1)$$

5. The viscosity estimation device according to claim 2, wherein, in case that it is assumed that the viscosity correlation value is ST, the frequency of the drive current is $\omega$ [rad/s] or [Hz], the rotation speed of the rotating shaft is $\omega_m$ [rad/s] or [Hz], the effective value of the drive current is $I_a$, and the slip ratio of the rotating shaft is s [%], the viscosity correlation value calculator is configured to obtain the viscosity correlation value ST by performing a calculation shown in the following expression (1)

$$ST = \frac{\omega}{\omega_m} \cdot I_a^2 \cdot s. \qquad (1)$$

6. The viscosity estimation device according to claim 3, wherein, in case that it is assumed that the viscosity correlation value is ST, the frequency of the drive current is $\omega$ [rad/s] or [Hz], the rotation speed of the rotating shaft is $\omega_m$ [rad/s] or [Hz], the effective value of the drive current is $I_a$, and the slip ratio of the rotating shaft is s [%], the viscosity correlation value calculator is configured to obtain the viscosity correlation value ST by performing a calculation shown in the following expression (1)

$$ST = \frac{\omega}{\omega_m} \cdot I_a^2 \cdot s. \qquad (1)$$

7. The viscosity estimation device according to claim 1, wherein
the drive current has three phases, and
the current detector is configured to detect all phases of the three phases.

8. The viscosity estimation device according to claim 1, wherein
the drive current has three phases, and
the current detector is configured to detect only one specific phase of the three phases.

9. The viscosity estimation device according to claim 1, wherein, in case that it is assumed that the slip ratio is s, a frequency of the drive current detected by the current detector is $\omega$, and a rotation speed of the rotating shaft detected by the rotation detector is $\omega_m$, the slip ratio calculator is configured to perform a calculation of $s=(\omega-\omega_m)/w$ to obtain the slip ratio.

10. The viscosity estimation device according to claim 3, wherein the frequency calculator is configured to obtain a frequency of the drive current each time the rotating shaft rotates by a prescribed number of revolutions.

11. The viscosity estimation device according to claim 10, wherein the effective value calculator is configured to obtain the effective value of the drive current each time the rotating shaft rotates by the number of revolutions.

12. The viscosity estimation device according to claim 1, wherein the calculator further includes a viscosity correlation value viscosity calculator which converts the viscosity correlation value obtained by the viscosity correlation value calculator into a viscosity value of the substance.

13. The viscosity estimation device according to claim 12, wherein the calculator further includes a filter calculator which performs smoothing processing on the viscosity value converted by the viscosity correlation value viscosity calculator.

14. The viscosity estimation device according to claim 1, wherein the rotation detector is configured to detect the rotation after the current detector has detected the drive current.

15. The viscosity estimation device according to claim 1, wherein the current detector is configured to detect the drive current after the rotation detector has detected the rotation.

16. The viscosity estimation device according to claim 1, wherein the current detector is configured to perform processing of detecting the drive current in parallel with processing of detecting the rotation by the rotation detector.

17. The viscosity estimation device according to claim 1, wherein the rotation detector is an encoder.

18. The viscosity estimation device according to claim 1, wherein the rotation detector is a tachometer.

19. The viscosity estimation device according to claim 1, wherein the calculator further comprises:

a viscosity correlation value viscosity calculator converting the viscosity correlation value obtained by the viscosity correlation value calculator into a viscosity value of the substance, the conversion being performed based on a variable which defines a scale factor of the viscosity correlation value and a variable which defines an offset of the viscosity correlation value.

20. A viscosity estimation method for estimating a viscosity of a substance stirred by a rotation of a rotating shaft rotationally driven by an induction motor, the viscosity estimation method comprising:

detecting a drive current supplied to the induction motor;

detecting rotation of the rotating shaft; and obtaining a viscosity correlation value, which is a value having a correlation with a viscosity of the substance, using a detection result of the drive current and a detection result of rotation of the rotating shaft, wherein during obtaining the viscosity correlation value:

a slip ratio of the rotating shaft is obtained using the detection result of the drive current and the detection result of the rotation;

an effective value of the drive current is obtained from the detection result of the drive current;

a frequency of the drive current is obtained from the detection result of the drive current; and the viscosity correlation value is obtained using a calculation result of the slip ratio, a calculation result of the effective value, and a calculation result of the frequency, wherein the viscosity correlation value is obtained by multiplying:

a value obtained by dividing the frequency of the drive current by a rotation speed of the rotating shaft obtained by the detection result of the rotation;

square of the effective value of the drive current; and the slip ratio of the rotating shaft.

* * * * *

UNITED STATES PATENT AND TRADEMARK OFFICE
CERTIFICATE OF CORRECTION

| | |
|---|---|
| PATENT NO. | : 12,140,517 B2 |
| APPLICATION NO. | : 17/604028 |
| DATED | : November 12, 2024 |
| INVENTOR(S) | : Hirofumi Okamoto et al. |

Page 1 of 1

It is certified that error appears in the above-identified patent and that said Letters Patent is hereby corrected as shown below:

In the Claims

Column 12, Line 31, (Claim 9), delete "$s = (\omega - \omega_m)/w$" and insert --$s = (\omega - \omega_m)/\omega$--.

Signed and Sealed this
Fourth Day of February, 2025

Coke Morgan Stewart
*Acting Director of the United States Patent and Trademark Office*